May 17, 1960

C. B. BRAHM 2,937,011

AIRCRAFT AIR CONDITIONING SYSTEM AND TEMPERATURE
CONTROL MEANS THEREFOR

Filed Aug. 23, 1957

2 Sheets-Sheet 1

INVENTOR
CHARLES B. BRAHM

BY Teller & McCormick

ATTORNEYS

May 17, 1960

C. B. BRAHM 2,937,011

AIRCRAFT AIR CONDITIONING SYSTEM AND TEMPERATURE
CONTROL MEANS THEREFOR

Filed Aug. 23, 1957

2 Sheets-Sheet 2

INVENTOR
CHARLES B. BRAHM

BY Teller & McCormick

ATTORNEYS

United States Patent Office 2,937,011
Patented May 17, 1960

2,937,011

AIRCRAFT AIR CONDITIONING SYSTEM AND TEMPERATURE CONTROL MEANS THEREFOR

Charles B. Brahm, Rockville, Conn., assignor to United Aircraft Corporation, East Hartford, Conn., a corporation of Delaware Application August 23, 1957, Serial No. 679,973

5 Claims. (Cl. 257—276)

This invention relates to an aircraft air conditioning system capable of providing air flow in more than one direction and under different modes of operation, and the invention relates more specifically to means for controlling temperature under all conditions of flow and to means for controlling the direction of flow and mode of operation of the air distributing system.

It is the general object of the invention to provide an air conditioning system and control means therefor which operate automatically to satisfy the air temperature requirements of a cabin and other compartments of an aircraft more efficiently than has heretofore been known. In fulfilling this general object of the invention, it is a further object to provide an air conditioning system capable of flow in one direction (normal flow direction) or in a reverse direction and to provide control means for automatically changing the direction of flow responsive to temperature conditions and to adjust and to control the air flow within the air distributing system under all conditions of operation for the purpose of maintaining the required temperature control.

The drawings show a preferred embodiment of the invention and such embodiment will be described, but it will be understood that various changes may be made from the construction disclosed and that the drawings and description are not to be construed as defining or limiting the scope of the invention, the claims forming a part of this specification being relied upon for that purpose.

Figure 1:
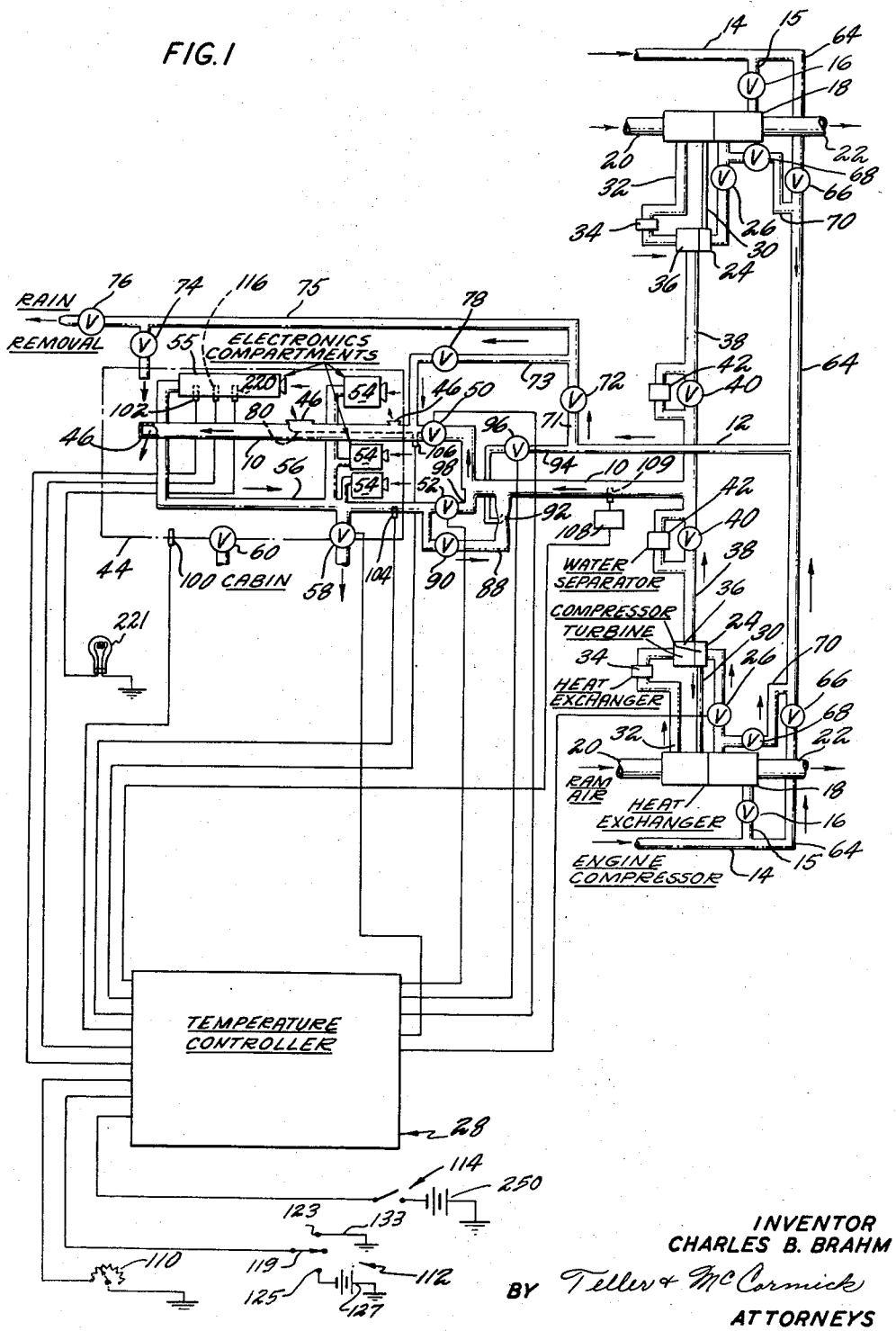
Figure 2:
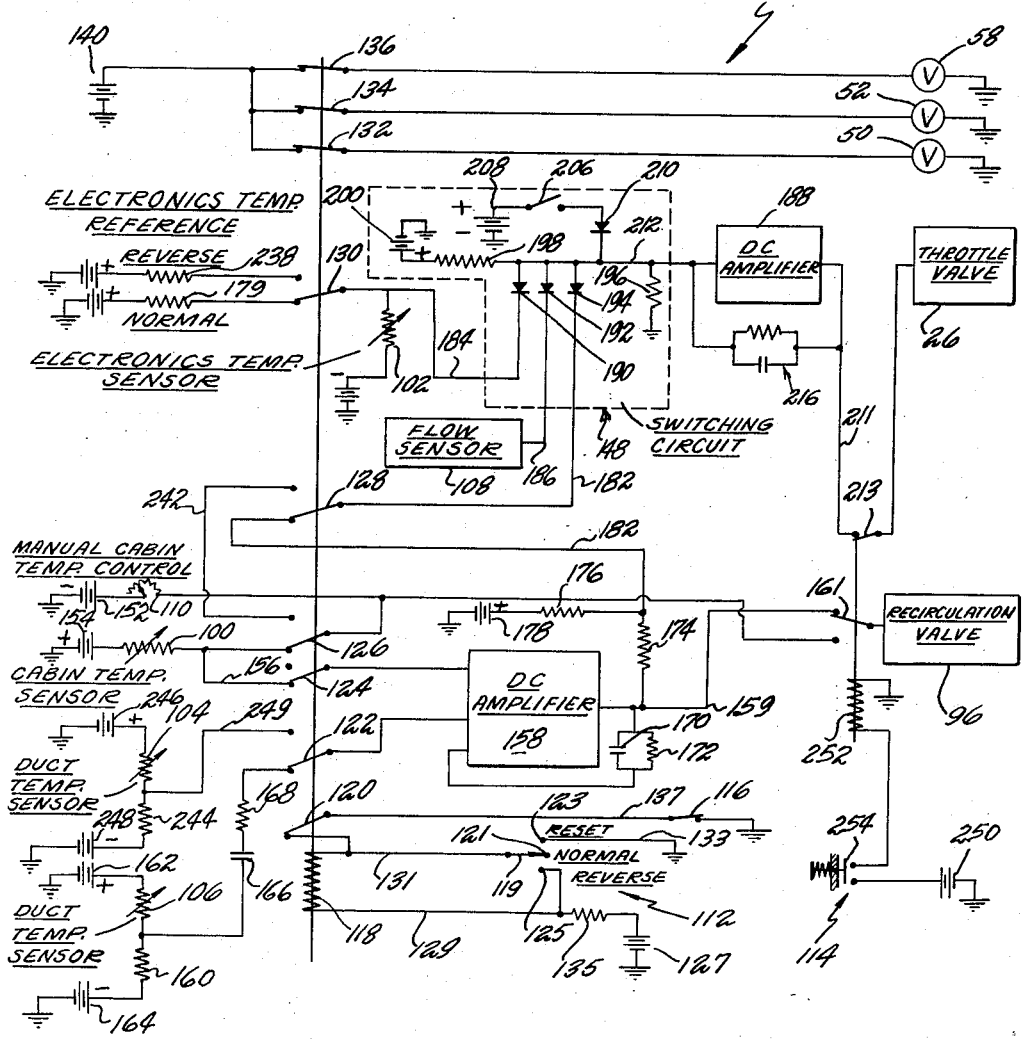

Of the drawings,

Fig. 1 is a schematic view of the aircraft air conditioning system, in particular the air distributing system, and also showing the general arrangement of the temperature and flow sensing devices located in the air distributing lines or conduits and which signals the electrical control means which in turn operates the various valves included in the air distributing system; and Fig. 2 is a schematic wiring diagram electrical control means for the aforesaid air conditioning system.

The air conditioning system, or so much thereof as relates to the arrangement of air distributing conduits and valves, etc., shown and to be described here is the same as that shown and described in the Stanley G. Best Patent No. 2,870,698, issued January 27, 1959, and entitled, "Recirculating Flow Aircraft Air Conditioning System." Reference can be had to the aforesaid copending application to supplement the present description of the air distributing system forming a part of the air conditioning system and its control.

The said distributing system is adapted to direct a supply of cold air in a conduit 10 and a supply of hot air in a conduit 12 for an aircraft compartment such as the cabin. The distributing system is to be supplied with compressed air from an aircraft engine, and when the system is adapted for installation on a multi-engine aircraft as shown, air is supplied to the cold and hot air lines 10 and 12 from at least two air circuits as shown. Since each air supply circuit is similar to the other, only one of the air supply and refrigerating circuits will be described herein.

Hot compressed air from the compressor of an aircraft engine is introduced to the air supply circuit at a conduit 14. A portion of the hot compressed air passes through a conduit 15 and a normally open shut-off valve 16 therein to a multi-stage heat exchanger 18. The multi-stage heat exchanger 18 is cooled by ram air admitted thereto in a conduit 20 and discharged therefrom in a conduit 22. Having passed through the first stage of the heat exchanger 18 so as to be partially cooled, the air is directed through a suitable conduit and a valve into a turbine driven compressor 24. The valve 26 comprises a throttle valve and is preferably an electrically operable valve which is controlled by electrical control means designated generally by the reference numeral 28. The operation of the electrical control means 28 and the operation of the throttle valve 26 thereby will be more fully described hereinafter.

Having passed through the compressor 24 wherein some heat is restored, the air is returned to the heat exchanger 18 through a conduit 30 for further cooling in the second stage of the said heat exchanger. The air is then discharged from the second or final stage of the heat exchanger 18 through a conduit 32 wherein an air-to-water heat exchanger 34 is located for further refrigeration of the air. A final stage of air cooling is accomplished at the turbine 36 which drives the compressor 24, the turbine being driven by the air discharged from the air-to-water heat exchanger 34 whereby further heat is extracted from the air by expansion within the said turbine. The air discharged from the turbine 36 passes through a conduit 38 and will either flow through a by-pass valve 40 or through a water separator 42 if water separation is needed before the refrigerated air is introduced to the cabin cold air inlet conduit 10. A shut-off valve 50 is located in the conduit 10 and the said cold air conduit 10 extends into the aircraft cabin 44 and has a plurality of outlets 46, 46 to supply air to the various stations within the cabin. The valve 50 in the cold air conduit 10 is open whenever the air flow in the air distributing system is in the "normal" direction but it is closed when the direction of air flow is reversed as will be described hereinafter. The valve 50 is preferably an electrically operable valve and it is controlled by electrical control means heretofore designated generally by the reference numeral 28.

The air which is introduced to the cabin 44 through the apertures 46, 46 in the cold air conduit 10 passes through a plurality of compartments 54, 54 which are disposed within the said cabin and connected by air passage means therewith and which have to be cooled to maintain proper operating conditions in the said compartments for electronics equipment disposed therein. An additional compartment 55 which is arranged in parallel relationship with the compartments 54, 54 contains a simulator which simulates the temperature requirements of the various electronics compartments 54, 54 so that one or more temperature responsive elements can be actuated to cause operation of the electrical control means 28 as will hereinafter be described to maintain the required temperature conditions in the said electronics compartments. A simulator of the type which may be used within the compartment 55 is shown in the copending application of Stanley G. Best and Charles B. Brahm which is entitled, "Aircraft Air Conditioning System Including a Temperature Simulator," Serial No. 679,856, filed August 23, 1957.

The air which is forced through the parallel arranged compartments 54, 54 and the compartment 55 by the cabin air pressure is discharged from the said compartments into a manifold 56. The air can be discharged from the aircraft by passing from the manifold 56 through a valve 58, but under certain operating conditions as will be described, the air can be recirculated from the manifold 56 for re-introduction into the cabin 44, or under "reverse" flow conditions as will be described, the air is introduced from the cold air conduit 10 into the manifold 56 for passage through the compartments 54, 54 and the compartment 55 into the cabin 44. Under "normal" flow operation as has been described above, the valve 58 constitutes a cabin pressure regulator which opens to discharge the air overboard only at a selected pressure whereby to maintain a desired cabin pressure. A cabin relief or dump valve 60 is also provided to maintain a preselected maximum pressure level in the cabin 44 and the said dump valve operates as a cabin pressure regulator during reverse flow operation, as will be described.

Turning now to consideration of the hot air supply, it is to be noted that a conduit 64 receives part of the air from the engine compressor discharge or bleed conduit 14 and that the said conduit 64 is connected with the hot air line 12. A throttle valve 66 is disposed in the conduit 64 to control the flow therein, and a check valve 68 is located in a conduit 70 which extends from the cold air supply circuit to the hot air supply line 64 on the downstream side of the throttle valve 66. The throttle valve 66 is to be operated by means responsive to temperature in the hot air line 12 or in the conduit 64 downstream of the valve 66, the valve 66 being constructed and arranged to close when the hot air temperature is excessive. When the valve 66 is closed, pressure in the conduit 64 is reduced downstream of the said valve whereby cooled air can flow through the check valve 68 in the conduit 70 into the conduit 64 to lower the hot air temperature. A valve construction suitable for the valve 66 and control means therefor are shown in the co-pending application of Otus E. Zuiderhoek, entitled, "Valve and Control Means For An Aircraft Air Conditioning System," Serial No. 679,918, filed August 23, 1957.

The hot air stream flowing in conduit 12 is used normally for three purposes; to add warm air to the cabin 44, to supply a stream for removing fog from the pilot's space within the cabin and from the windshield, and to provide a stream for removing rain from the outside of the windshield. The hot air used for the aforesaid three purposes is taken from the hot air line 12 to a conduit 71 wherein a pressure regulating valve 72 is located and is passed through branch conduits 73 and 75. The conduit 75 extends forwardly of the aircraft cabin to supply the cockpit and windshield de-fogging stream through a valve 74 and to supply the windshield rain removal stream through a valve 76. The valves 74 and 76 are preferably manually operated by the pilot or they are operated by means which can be manually actuated by the pilot.

The branch line 73 which supplies warm air for increasing the cabin temperature, especially in the rearmost stations thereof, opens into the main cabin supply conduit 10 adjacent the entrance thereof into the cabin, and the said branch conduit 73 contains a manually operable flow control and shut-off valve 78. A baffle 80 is disposed in the main cabin supply conduit 10 within the cabin to direct the warm air introduced thereto through the rear most outlets 46, 46 within the cabin so that the rearmost cabin stations are heated by the addition of warm air from the conduit 73. The pilot's space at the front of the cabin can be warmed by opening the valve 74 to introduce the de-fogging stream thereto.

Temperature control of the air in the cabin 44 and in the electronics compartments disposed therein is further controlled and increased over the level obtaining if only cold air is introduced to the cabin through the conduit 10 by providing for recirculation of some of the air under certain conditions from the electronics compartment and cabin discharge manifold 56 to the main cabin supply conduit 10 on the upstream side of the cabin. To provide for such recirculation, a recirculating conduit 88 is connected between the manifold 56 and the main cabin inlet conduit or cold air line 10 on the upstream side of the valve 50 therein. A check valve 90 is provided in the recirculating conduit 88 to accommodate air flow only in the direction from the manifold 56 to the cold air line 10. Such recirculating flow is induced by the provision of a jet nozzle 92 in the recirculating conduit 88. The jet nozzle 92 which comprises a jet pump or ejector is disposed in the end of a hot air conduit 94 which communicates with the hot air line 12. A valve 96 is located in the hot air line 12 to open and to close whereby to provide the pumping stream at the nozzle 92. When the valve 96 is opened, recirculating flow of air warmed by passage through the cabin and electronics compartments is induced and the flow of the pumping stream of hot air through the nozzle 92 further increases the temperature in the main supply conduit 10 for the cabin by mixing recirculated and hot air with the cold air therein. The valve 96 will hereinafter be referred to as the recirculating valve and it is operated by the electrical control means heretofore designated generally by the reference numeral 28.

In addition to providing for recirculation of some of the air, the air distribution system or air supply system to the cabin can be operated in a reversed direction. That is, the air conditioning system is adapted to receive air from the main supply or cold air line 10 for introduction initially to the electronics discharge manifold 56 through which it passes to the electronics compartments 54, 54 and then flows into the cabin 44. To provide for such reverse flow operation, a conduit 98 is connected between the manifold 56 and the main supply conduit 10, the connection to the conduit 10 being on the downstream side of the connection between the said conduit and the recirculating conduit 88. A valve 52 is disposed in the reverse flow conduit 98, the valve 52 being closed during flow in the "normal" direction and being opened for flow in the "reverse" direction. The valve 50 in the conduit 10 is open for normal flow and is closed for reverse flow. Like the valve 50, the valve 52 is operated by the electrical control means heretofore designated generally by the reference numeral 28. Reverse flow through the electronics compartments and the aircraft cabin is to be accomplished when the said electronics compartments are insufficiently cooled as may occur when the cabin 44 is not pressurized so as to force air through the electronics compartments. The electrical control means 28 in addition to opening the valve 52 and closing the valve 50 for reverse flow operation closes the cabin pressure regulator valve 58 during reverse flow operation so that the cabin dump valve 60 will act as the cabin pressure regulator.

As previously mentioned, the electrical control means 28 operates the throttle valve 26 so as to control flow of cold air into the main cabin supply conduit 10. The electrical control means receives signals for operation of the throttle valve 26 from means sensing flow in the conduit 10 and from temperature sensitive means responsive to air temperature in the cabin and/or in the electronics compartments. The electrical control means 28 operates the recirculating valve 96 to control temperature during normal flow operation by controlling recirculation and it also operates the valve 96 to control temperature during reverse flow operation by selectively adding hot air to the flow at the jet nozzle 92. In operation of the recirculating valve 96, the electrical control means 28 responds to signals from temperature responsive means and/or to signals from manually operable signal means. The electrical control means 28 operates the valve 50, 52 and 58 to switch between normal and reverse flow operating conditions responsive to temperature sensitive signalling means and/or responsive to manually operated signalling means. It can be said generally that the electrical control means 28 controls operation of the air conditioning system to regulate cabin temperature to a manually selected level, to limit the maximum temperature in the electronics compartments, to provide a minimum limit on air flow in the conduit 10, and under certain conditions to provide a maximum limit on air flow in the conduit 10, and the electrical control means also operates to effect reverse flow operation to avoid excessive temperatures in the electronics compartments. The operation of the electrical control means 28 will be understood from the following description of the elements utilized therein including the various devices utilized to provide a control signal to the electrical control means 28.

Control signals for operation of the electrical control means 28 are provided by a temperature responsive element 100 reacting to cabin air temperature, a temperature responsive element 102 reacting to the temperature of the simulator within the compartment 55 and thus reacting to the temperature in the electronics compartments 54, 54, a temperature sensitive element 104 reacting to the temperature in the electronics compartment discharge manifold 56, and a temperature sensitive element 106 reacting to temperature in the main cabin supply conduit 10 adjacent the inlet to the cabin. All of the aforementioned temperature responsive or sensitive elements can be provided in known form. The preferred form of temperature responsive element comprises a thermistor which has a negative temperature coefficient so that an increase in temperature causes a proportional reduction in resistance. An additional signal is supplied to the control means 28 by a flow sensing device indicated generally by the reference numeral 108. Such a flow sensing device may include a vane located within the conduit 10 so as to be displaced by air flow therein. Displacement of the flow vane, which is designated by the reference numeral 109, can be utilized to displace one winding of an induction transformer so as to provide a signal which can be amplified for transmission to the electrical control means 28. Further signaling devices for the control means 28 include a manually adjustable rheostat 110 which is set by the pilot to select a desired cabin temperature, a manually operated switch mechanism indicated generally by the reference numeral 112, and an additional manually operated switch mechanism indicated generally by the reference numeral 114. A further signal is provided for the control means 28 by a thermo-switch 116 which is responsive to the temperature of the simulator in the compartment 55 simulating temperature conditions in the electronics compartments 54, 54.

Reference is now made to Fig. 2 of the drawings for a description of the electrical control means 28. In Fig. 2, all of the elements of the electrical control mechanism are shown in the position assumed for operation of the air conditioning system under normal conditions where the direction of flow is in the "normal" direction. An important element of the electrical control means 28 is a relay which comprises a coil 118 and a plurality of switch armatures 120, 122, 124, 126, 128, 130, 132, 134 and 136 which are operated by the said relay coil. When the relay coil 118 is energized, all of the aforementioned switch armatures are disposed in the down position shown and when the coil is de-energized, all of the switches are biased upwardly by suitable means, not shown. The relay 118 is energized to cause flow in the air conditioning system in the "normal" direction and the relay is de-energized to cause flow in the "reverse" direction. To start the control means 28 into controlling operation under the normal flow condition, the manually operated switch mechanism 112 is utilized. This switch mechanism includes an armature 119 which is biased into engagement with a "normal" contact 121 and it can be moved manually to a "reset" contact 123 or to a "reverse" contact 125. To start normal operation, the armature 121 is moved into engagement with the reset contact 123 whereby to complete a circuit to the relay coil 118 from a suitable source of D.C. energy 127 through conductors 129, 131 and 133. A resistance 135 is included in the relay circuit to limit the load therein. Immediately upon engaging the armature 119 with the reset contact 123, the relay coil 118 is energized to close the switch armature 120 in a power circuit which includes a conductor 137 and the thermal switch 116. The switch 116 is normally closed and opens only when the temperature of the simulator in the compartment 55 reaches a preselected maximum level. (This temperature level corresponds to a maximum selected temperature or predetermined temperature for operation of the electronics devices in the compartments 54, 54.) Thus, it will be seen that after the relay coil 118 has been energized by engaging the switch armature 119 with the reset contact 123, the said armature 119 can be released to return to the engagement with the normal contact or stop 121 and the relay coil 118 will remain energized. The relay coil 118 is only de-energized when the thermal switch is opened by reason of excessive temperature in the electronics compartments 54, 54, or the relay coil can be de-energized by engaging the armature 119 with the reverse flow contact 125 which shorts the relay coil 118, causing it to be de-energized.

In assuring that the normal direction of flow will result from energizing the relay coil 118, the relay operated switch armatures 132, 134 and 136 connect the valves 50, 52 and 58, respectively, with a suitable source of direct current energy 140. The electrically operated valve 50 is constructed and arranged to open when energized, the valve 52 is constructed and arranged to close when energized, and the electrically operated valve 58 is also constructed and arranged to close when energized. Thus, the previously described valve condition is obtained for normal flow operation. The particular construction of the valves 50, 52 and 58 and the specific construction of the other valves utilized herein need not be described for an understanding of the present invention. These valves can be pneumatically operated by means which are electrically controlled or the valves can be simple solenoid operated valves and will suit the purposes of this invention.

During normal flow operation, the electric control means 28 automatically regulates temperature in the cabin 44 to a selected level. The desired cabin temperature is selected by the aircraft pilot by adjustment of the manually operable rheostat 110 which is preferably calibrated in degrees of temperature. The resistance selected at the rheostat 110 which is in keeping with a selected temperature is compared in a bridge circuit with the resistance offered by the temperature responsive resistance element 100 which is exposed to the cabin air so as to sense actual cabin air temperature. More specifically, a negative direct current voltage supply 152 is connected in series with the manually adjustable rheostat 110 and the bridge circuit is completed through the relay armature 126 to the thermistor 100 which is connected in series with a direct current voltage supply 154 of positive voltage equal in magnitude to the voltage supply 152. The arrangement of the bridge circuit is such that in the event the cabin air temperature exceeds the temperature selected at the rheostat 110, the resistance of the cabin thermistor 100 decreases and the voltage output at the conductor 156 constitutes a positive signal which is directed through the relay armature 124 to a standard or known direct current amplifier indicated generally by the reference numeral 158. The positive error signal transmitted to the direct current amplifier 158 undergoes a phase shift of 180° so that the amplifier transmits a negative voltage signal through the conductor 159 and a switch armature 161 to the recirculating valve 96. The recirculating valve 96 is preferably a modulating valve which is actuated by a proportional solenoid which functions to regulate air flow in proportion to the magnitude of the voltage signal. A valve of this general type and suitable for the purposes here is shown in the co-pending application of Stanley G. Best, entitled "Dual Supply Air Conditioning System Having Value Means for Equalizing the Supply Flow," Serial No. 655,664, filed April 29, 1957. When the recirculating value 96 receives a negative voltage signal as described, it is moved toward its closed position thereby decreasing the flow of recirculating air and warm air to the cabin so as to restore the cabin air temperature to the reduced, selected level. If the temperature in the cabin drops below the selected level, a negative bridge signal is transmitted to the amplifier and a positive signal is transmitted to the recirculation valve 96 so that the said recirculation valve will be moved towards its open position to increase the flow of warm air to the cabin and thus to increase the cabin air temperature.

In further accord with the present invention, the electrical control means is adapted to sense the rate of change of the temperature in the air flowing to the cabin whereby to avoid "over correction" of the cabin temperature and also to avoid the deleterious results of changing the cabin temperature too rapidly. The means included in the electrical control for accomplishing this end comprises the thermistor 106 which is located in the cabin air supply conduit adjacent the inlet to the cabin and it also comprises a reference resistor 160 which is connected in a bridge circuit with the thermistor 106. As shown in Fig. 2, the said bridge circuit includes the direct current voltage supplies 162 and 164 which are positive and negative supplies, respectively. A known derivative network is connected to the bridge and comprises a capacitor 166 and a resistor 168 and the said derivative network connects the bridge to the direct current amplifier 158 through one of the relay operated switch armatures 122. The rate of air temperature change signal is transmitted through the derivative network to the direct current amplifier 158 for amplification and transmission to the recirculation valve 96. The recirculation valve is then adjusted to decrease the rate of temperature change in the cabin air supply to a desired or acceptable rate. This signalling circuit has no effect during operation when there is no temperature change taking place, this circuit functioning only as means to provide anticipation during transient operating conditions.

It will be observed that there is a feedback network for the direct current amplifier 158, the said feedback network comprising a capacitor 170 and a resistor 172 arranged in parallel to impart a frequency responsive characteristic which provides a high steady state sensitivity combined with satisfactory stable control system response. It will also be observed that the output of the amplifier 158 at the conductor 159 is biased by a voltage supply 178 to a continuous positive polarity condition and the signal is transmitted by a conductor 182 through relay armature 128 to a switching circuit designated generally by the reference numeral 148. The signal received in the switching circuit 148 from the direct current amplifier 158 is combined with other signals therein for operation of the throttle valve 26 as will now be described.

One such additional signal received in the switching circuit 148 is transmitted from a direct current bridge network comprising a fixed resistor 179 and the thermistor 102 which is located in the simulator compartment 55 so as to be responsive to temperature of the electronics compartments 54, 54. This bridge signal is transmitted to the switching circuit through the conductor 184. The signal transmitted to the switching circuit 148 in the conductor 184 is normally a low magnitude positive voltage signal which is negative going in response to temperature in excess of a preselected level for the electronics compartments, the preselected temperature being fixed by the selection of the fixed resistor 179.

A third signal introduced to the switching circuit 148 is transmitted from the flow sensor 108. As previously mentioned, the flow sensor 108 includes the vane 109 in the conduit 10 which is turned by impact force of the air flowing in the said conduit to rotate one coil of an induction transformer. A phase sensitive demodulating circuit of known form is utilized with a known amplifier to provide a direct current signal in the conductor 186 to the switching circuit 148, the said signal being proportional to the flow through the conduit 10. A negative going signal is transmitted from the flow sensor 108 when the flow through the conduit 10 is inadequate. A positive going signal is transmitted from the said flow sensor when the flow therethrough is adequate. Adequate flow is established at a level which permits of proper cabin pressurization and ventilation.

All of the signals transmitted to the switching circuit 148 in the conduits 182, 184 and 186, respectively, are transmitted only under conditions where increased flow of cold air is required. That is, a positive voltage low magnitude signal which is going negative is transmitted in the conductor 182 from the direct current amplifier 158 whenever the direct current amplified signal is directed to the recirculation valve 96 to close the same so as to decrease cabin air temperature. A similar low magnitude positive voltage signal which is going negative is transmitted in the conductor 184 to the switching circuit whenever the temperature in the electronics compartment is excessive and more cold air is desired. Similarly, a low magnitude positive voltage signal which is going negative is transmitted to the switching circuit in the conductor 186 when more cold air flow is required to maintain minimum flow conditions. The switching circuit 148 is adapted to transmit whichever of the three voltage signals in the conduits 182, 184 and 186 is the least positive, the said least positive signal being transmitted to a direct current amplifier 188. To accomplish this, the switching circuit 148 includes the three rectifiers 190, 192 and 194 and the resistors 196 and 198. A direct current voltage supply 200 of relatively high magnitude and of positive polarity is introduced to the conductor 212 extending to the direct current amplifier 188 to which conductor each of the rectifiers 190, 192 and 194 in the signal conductors 184, 186 and 182 are connected. If the positive voltage in the conductor 212 at the juncture of any one of the said rectifiers is of higher magnitude than the voltage carried by the associated signal conductors, the associated rectifiers will conduct so that the voltage in the conductor 212 is reduced to essentially the voltage level existing in the signal conductors. Thus, the least positive signal from any one of the signal conductors 182, 184 and 186 is transmitted to the direct current amplifier 188 wherein it undergoes a phase shift with amplification so that a positive going voltage is transmitted in the conductor 211 to the throttle valve 26 through a relay operated armature 213. The throttle valve 26 is preferably of the type which can be operated by a proportional solenoid so as to be moved in the opening direction upon receipt of a positive going voltage signal.

At this point it should be noted that the signal introduced to the switching circuit 148 by the conductor 182 from the recirculation valve amplifier 158 is biased so that it can be controlling of the throttle valve 26 only when the recirculation valve 96 is in the fully closed position. This mode of operation is desirable in order that the temperature controlling electrical means 28 shall not work against itself by calling for increased cold air flow at the throttle valve 26 during a time when heat is being added to the cabin air flow by an open recirculation valve 96. As mentioned above, a negative going signal voltage at the output of the recirculation valve amplifier 158 causes the recirculation valve 96 to move toward a closed position. The bias on this amplifier output signal, which is accomplished by the resistors 174 and 176, and the positive voltage supply 178, is such that the signal transmitted to the switching circuit 148 can only be of sufficient magnitude to constitute a controlling signal in the said switching circuit when the recirculating valve 96 is fully closed.

A rectifier 210, a switch 206, and a voltage supply 208 cooperate in the switching circuit 148 to limit the maximum opening of the throttle valve 26 during certain conditions of aircraft operation. For example, when the aircraft is landing or taking off, it may be advantageous to limit the amount of air bled from the aircraft compressor so as to improve aircraft performance. The switch 206 may be arranged to close whenever the landing gear is lowered as will be the case during landing and take-off operations of the aircraft. When the switch 206 is closed, the voltage supply 208 is directed to the conductor 212 through the rectifier 210 to provide a limit on the negative going voltage signal directed to the amplifier 188. Since all of the switching circuit signals calling for movement of the throttle valve toward open position are of negative going characteristics, a properly selected power supply 208 will cause the rectifier 210 to conduct whenever the voltage signal in line 212 is of a lower magnitude than the power supply. The voltage signal to the amplifier 188, therefore, will be limited at some positive value above zero and the throttle valve 26 will be prevented from traveling to its fully open position. A compensating or feedback network indicated generally by the reference numeral 216 is connected around the amplifier 188 for improved stability and sensitivity.

As thus far described, the electrical control means 28 has been conditioned to control operation of the air distributing or air conditioning system for flow in the "normal" direction. Flow in the "reverse" direction is desirable whenever the temperature in the electronics compartments 54, 54 reaches a preselected maximum and is allowed to attain that maximum despite the temperature increase effective by recirculation. Reverse flow operation is instituted either automatically or manually. Automatic reverse flow operation is effected by opening of the thermal switch 116 which is connected to the simulator in the compartment 55 and which is adapted to open only when the simulator temperature or electronics compartment temperature reaches the aforesaid maximum level. As previously described, whenever the switch 116 is opened, the relay coil 118 is de-energized and the switch armature controlled thereby are biased upwardly. If the switch 116 fails to open at the preselected maximum temperature, another switch 220 which is thermo-responsive and which is attached to the electronics temperature simulator may be adapted to close to complete a circuit from a suitable source of electrical energy to a warning lamp 221 shown in Fig. 1. This lamp will serve to warn the aircraft pilot that the temperature condition in the electronics compartments 54, 54 is excessive and that reverse flow operation of the air conditioning system is needed. Then, the pilot can effect reverse flow operation by operation of the manual switching mechanism 112. That is, the pilot places the switch armature 119 is engagement with the contact 125 to shunt the relay 118 whereby reverse flow condition is obtained within the electrical control means 28.

When the reverse flow condition caused by de-energizing the relay coil 118 is effected, the switch armatures 132, 134, and 136 are open whereby the flow control valves 50 and 52 are respectively closed and opened and the pressure regulator valve 58 is closed. This positioning of the flow control valves effects reverse flow operation of the air conditioning system and during such reverse flow operation, the cabin relief valve 60 operates as a pressure regulator for the cabin.

During reverse flow operation of the air conditioning system, the electrical control means 28 operates the recirculation valve 96 to maintain a minimum temperature level in the air stream flowing from the supply into the electronics manifold 56, this being effected by a signal transmitted from the temperature responsive element 104 disposed in the said manifold. As shown in Fig. 2, the thermistor 104 is connected in a bridge network with a fixed resistance 244, the network being completed by the direct current voltage supplies 246 and 248. The bridge signal is transmitted to the recirculation valve amplifier 158 through a conductor 249 and through the relay armature 122. The amplified signal causes the recirculation valve 96 to open so that hot air will be added to the cold air flow to the manifold by introduction through the jet nozzle 92 whenever the minimum air temperature in the said manifold is reached.

Also, during reverse flow operation, the throttle valve 26 is operated by the electrical means 28 to maintain a maximum temperature limit in the electronics compartments 54, 54 in response to a signal from the temperature responsive element 102 responding to electronics compartment simulator temperature. The throttle valve is also operated to maintain a minimum flow limit in the conduit 10 in response to a signal from the flow sensor 108, and the throttle valve is further operated to maintain a selected cabin temperature as is set on the manually operated rheostat 110. In maintaining a maximum temperature limit in the electronics compartments 54, 54, a new bridge circuit is combined with the electronics thermistor 102. That is, the relay operated armature 130 is switched to an upper position to connect a new reference resistor 238 in the bridge circuit in place of the prior reference resistor 179. The bridge circuit operates in the same manner as the replaced bridge circuit to signal the switching circuit and the throttle valve, but temperature in the electronics compartments is controlled to a new level as dictated by the fixed resistor 238.

Operation of the switching circuit and the throttle valve to maintain a desired minimum flow in the conduit 10 is the same as the operation thereof during normal flow operating conditions.

When switching from normal to reverse flow, the relay operated armatures 126 and 128 are moved to their upper positions whereby to interconnect the manually set cabin temperature rheostat 110 through the conductor 242 with the switching circuit rectifier 194. Thus, cabin temperature is maintained by operation of the throttle valve during reverse flow operation and cabin temperature is not influenced or controlled by operation of the recirculation valve 96. In this connection, it should be noted that the cabin temperature sensing element 100 is switched out of the control circuit by movement of the switch arm 126 upwardly, and it should also be noted that no signal is transmitted from the recirculation valve amplifier 158 to the switching circuit 148 because the armature 128 has been moved upwardly. During reverse flow operating conditions of the air conditioning system, the switching circuit 148 acts in the same manner as it acts during normal flow operation.

It should also be noted that cabin air temperature can be controlled with less precision during reverse flow operation. That is, the aircraft operator can only select a temperature on the rheostat 110 and there is no comparing signal provided by a cabin temperature thermistor. If the pilot controlled rheostat 110 calls for decreased cold air flow during reverse flow operation, decreased cold air flow will not occur if the signal to the switching circuit 148 from the electronics temperature control bridge or from the flow sensor control is less positive so as to control operation of the switching circuit.

The electrical control means 28 also includes means which can be manually actuated by the aircraft operator so that the operator can control the throttle valve 26 and the recirculation valve 96 in the event that the cooling is inadequate during automatic normal or reverse flow operation. The means for effecting such operator control includes a direct current source 250 which can be completed to energize a relay coil 252 by closing a manually operable switch button 254. When the relay coil 252 is energized, the switch armature 213 in the control circuit to the throttle valve 26 is opened. The throttle valve 26 is adapted to assume a fully open position whenever the electrical control therefor is de-energized.

Also, when the relay coil 252 is energized, the switch armature 161 is moved downwardly to effect a direct connection between the recirculation valve 96 and the pilot operated temperature control rheostat 110. Thus, it will be seen that when the aircraft operator closes the switch 254 full cold air flow to the cabin is accommodated by opening the throttle valve 26, but some warm air can be introduced to the flow by the recirculation valve 96 as controlled or signalled directly by the manually adjusted cabin temperature rheostat 110.

The invention claimed is:

1. An air conditioning system for at least two aircraft compartments which are connected by air passage means for air flow in series therethrough, the said system comprising an inlet conduit connectible with a pressurized source of cold air and connected to one compartment, an electrically operable throttle valve disposed in said cold air inlet conduit, an air discharge manifold connected with another compartment, electrically operable means for inducing recirculating air flow from said manifold to said inlet conduit selectively, and electrical control network means for operating said throttle valve and said electrically operable means responsive to temperature induced electrical signals and comprising first signal generating means including an element responsive to temperature in said one compartment to control said electrically operable means whereby to induce recirculating flow responsive to a temperature decrease in said one compartment from a preselected level and to reduce recirculating flow responsive to a temperature increase in said one compartment from a preselected level, the said electrical control network means being adapted also to operate said throttle valve responsive to signals from said first signal generating means when there is no recirculating flow, and second signal generating means including an element responsive to temperature in said other compartment to effect opening movement of said throttle valve responsive to temperature increase from a preselected level and to effect closing movement of said throttle valve responsive to temperature decrease from a preselected level.

2. An air conditioning system for at least two aircraft compartments which are connected by air passage means for air flow in series therethrough, the said system comprising an inlet conduit connectible with a pressurized source of cold air and connected to one compartment, an electrically operable throttle valve disposed in said cold air inlet conduit, an air discharge manifold connected with another compartment, a recirculating conduit connected between said manifold and said inlet conduit, a hot air line having a jet nozzle disposed in said recirculating conduit to induce recirculating flow and to introduce hot air to the inlet conduit, an electrically operable recirculating valve disposed in said hot air line to open and close the same, and electrical control network means for operating said throttle valve and said recirculating valve responsive to temperature induced electrical signals and comprising first signal generating means including an element responsive to temperature in said one compartment whereby to open said recirculating valve responsive to temperature decrease therein from a preselected level and to close said recirculating valve responsive to temperature increase therein from a preselected level, the said electrical control network means being adapted to operate said throttle valve responsive to signals from said first signal generating means when said recirculating valve is closed, and second signal generating means including an element responsive to temperature in said other compartment to effect opening movement of said throttle valve responsive to temperature increase therein from a preselected level and to effect closing movement of said throttle valve responsive to temperature decrease therein from a preselected level.

3. An air conditioning system for an aircraft compartment, the said system comprising an inlet conduit connectible with a pressurized source of cold air for the compartment, an electrically operable throttle valve disposed in said cold air inlet conduit, an air discharge manifold for the compartment, a recirculating conduit connected between said manifold and said inlet conduit, electrically operable means disposed in said recirculating conduit for inducing flow therethrough, and electrical control network means for operating said throttle valve and for operating said electrically operable means and comprising first signal generating means including an element responsive to temperature in said compartment to control said electrically operable means, and second signal generating means including an element responsive to air flow in said inlet conduit for overriding the signal from said first signal generating means and operating said throttle valve to maintain flow through said inlet conduit adequate for compartment pressurization and ventilation.

4. An air conditioning system for at least two aircraft compartments which are connected by air passage means for air flow in series therethrough, the said system comprising an inlet conduit connectible with a pressurized source of cold air and connected to one compartment, an electrically operable throttle valve disposed in said cold air inlet conduit, an air discharge manifold connected with another compartment, conduit means connectible with a source of warmed air and connected with said inlet conduit, electrically operable means for controlling flow in said conduit means whereby to control the introduction of warmed air to said inlet conduit, a reverse flow conduit interconnecting said manifold and the inlet conduit, a normally open electrically operable valve in said inlet conduit adjacent said one compartment, a normally closed electrically operable valve in said reverse flow conduit, and electrical control network means for operating all of the said valves and said electrically operable means and comprising first signal generating means including an element responsive to temperature in said one compartment for operation of said electrically operable means, second signal generating means including an element responsive to temperature in said other compartment for operating said throttle valve, thermo-responsive switch means responsive to temperature in said other compartment for opening said normally closed valve and for closing said normally open valve whereby to cause air flow from said inlet conduit through said manifold to said other compartment and said one compartment in series, and third signal generating means responsive to temperature in said one compartment during the said last mentioned flow condition for operation of said throttle valve.

5. An air conditioning system for at least two aircraft compartments which are connected by air passage means for air flow in series therethrough, the said system comprising an inlet connectible with a pressurized source of cold air and connected to one compartment, an electrically operable throttle valve disposed in said cold air inlet conduit, an air discharge manifold connected with another compartment, a recirculating conduit connected between said manifold and said inlet conduit, a hot air line having a jet nozzle disposed in said recirculating conduit to induce recirculating flow and to introduce hot air to the inlet conduit, an electrically operable recirculating valve disposed in said hot air line to open and close the same, a reverse flow conduit interconnecting said manifold and the inlet conduit, a normally open electrically operable valve in said inlet conduit adjacent said one compartment, a normally closed electrically operable valve in said reverse flow conduit, and electrical control network means for operating all of the said valves responsive to temperature induced electrical signals and including first signal generating means including an element responsive to temperature in said one compartment whereby to operate the recirculating valve, second signal generating means including an element responsive to rate of change of temperature in said inlet conduit to operate the recirculating valve, the said electrical control network means being adapted also to operate said throttle valve responsive to signals from said first and second signal generating means when said recirculating valve is closed, third signal generating means including an element responsive to temperature in said other compartment for operating said throttle valve, fourth signal generating means including an element responsive to air flow in said inlet conduit for operating said throttle valve, and a temperature sensitive switch responsive to temperature in said other compartment for operating said normally open and normally closed valves to close and open the same, respectively, whereby to cause air flow from said inlet conduit to said other compartment and then to said one compartment when the temperature in said other compartment reaches a predetermined maximum.

References Cited in the file of this patent
UNITED STATES PATENTS

| | | |
|---|---|---|
| 1,924,733 | Brock | Aug. 29, 1933 |
| 2,327,664 | Otis | Aug. 24, 1943 |
| 2,370,886 | Solberg | Mar. 6, 1945 |
| 2,496,862 | Del Mar | Feb. 7, 1950 |
| 2,507,057 | Solberg | May 9, 1950 |
| 2,574,925 | Lehane et al. | Nov. 13, 1951 |
| 2,643,944 | Malir | June 30, 1953 |
| 2,752,891 | Farkas | July 3, 1956 |
| 2,756,026 | Myrent et al. | July 24, 1956 |
| 2,870,698 | Best | Jan. 27, 1959 |